3,076,717
COMPOSITIONS FOR BUILDING LOAD SUPPORTING SURFACES

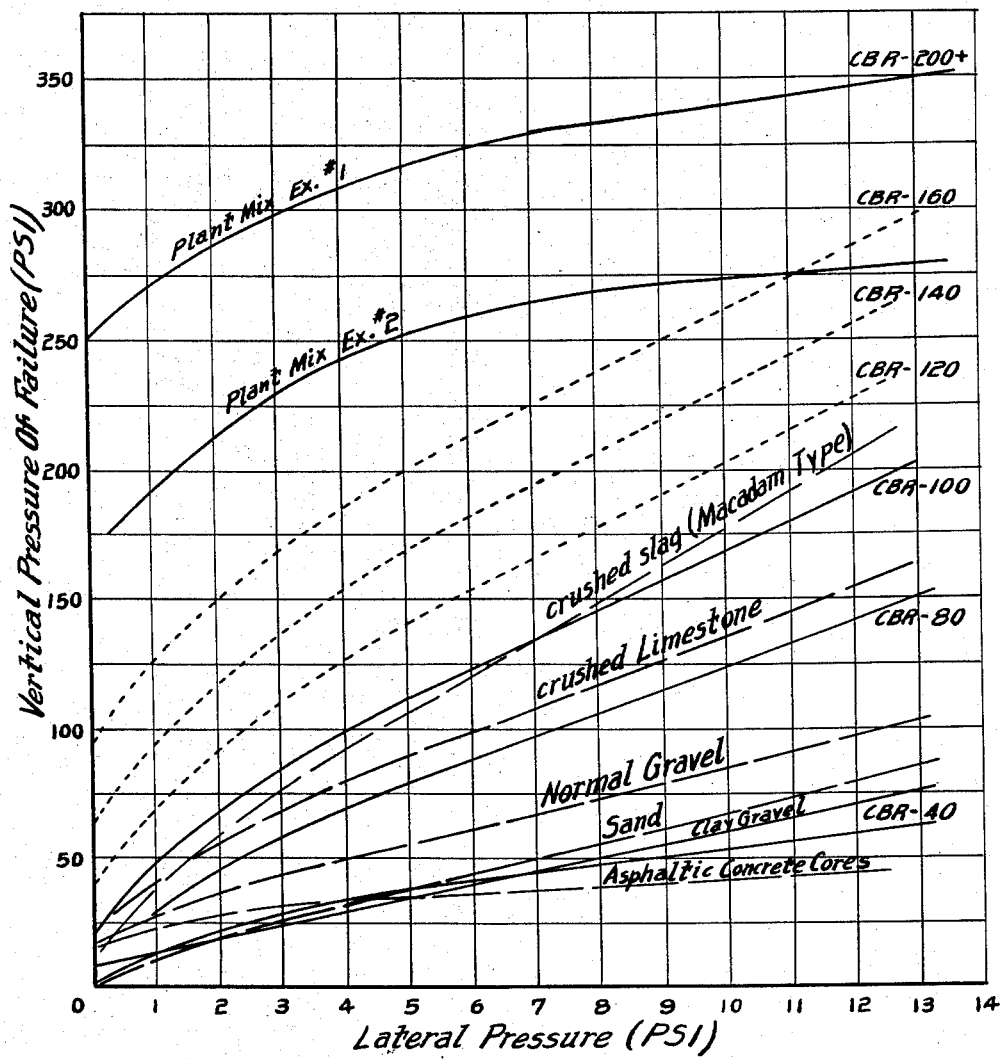
*Pavement Strength Curves*

Leonard John Minnick, Cheltenham, Pa., assignor to G. & W. H. Corson, Inc., Plymouth Meeting, Pa., a corporation of Delaware
Filed July 31, 1959, Ser. No. 830,900
6 Claims. (Cl. 106—118)

This invention relates to compositions for building load supporting surfaces such as road bases, highways, airfield runways and the like. More specifically, this invention is directed to a non-plastic, slow setting composition of matter having excellent bearing characteristics immediately after the load supporting surface is formed.

For years the art has attempted to provide a material which can be placed in sub-freezing temperatures and which will support heavy loads immediately, and which results in a permanent Portland cement concrete-like load supporting surface. It is well known that Portland cement concrete does not set up at temperatures below 40° F. Bituminous concrete, for example, must also be applied at temperatures above 40° F. Other compositions have either met with similar difficulties or have failed to provide an adequate load supporting base during periods of sub-freezing temperatures.

It is accordingly an object and advantage of this invention that a material may be provided which may be placed at temperatures below 40° F. and such material provides an excellent load supporting surface material.

Modern highways and the like are constructed in the form of a plurality of layers one upon another. For example, a typical highway may have a pavement layer, a compacted gravel base layer beneath the pavement layer, another compacted sub-grade layer beneath the gravel base layer, and a fourth layer in the form of a further sub-grade. It is important to insure the integrity and stability of a layered pavement system against failure under repeated wheel loadings, and this is an important object and advantage of this invention.

A primary object of this invention is to provide a base material that has superior properties over other types of base normally employed, in a layered system. Still another object is to provide a base material having a greatly improved stress distribution gradient, which is the load spreading ability of the material comprising the sub-base.

The patents to Havelin and Kahn, No. 2,698,252 and No. 2,815,294, relate to compositions for stabilizing plastic soil, which are to be distinguished sharply from this invention. Such compositions contain substantial quantities of soil having a fineness modulus below 1.7, and a three-way chemical reaction takes place whereby the lime, fly ash and soil coact to form strength bonds. Such compositions have excellent qualities for "mix-in-place" operations where it is desired to mix lime and fly ash with soil at the location where the load supporting surface is being built. According to the aforementioned Havelin and Kahn patents, many inherent limitations of plastic soils are overcome by reason of an early pozzolanic reaction causing chemical "setting" to the extent that highly satisfactory load supporting bases having early strength characteristics may be constructed. This has been found to be true even when the soils are highly plastic clays, loams or silts.

An earlier U.S. patent to Havelin and Kahn, No. 2,564,690, is directed to the formation of a load supporting base using lime, fly ash and a sandy type of aggregate having a fineness modulus of at least 1.7, substantially all of which passes through a 3/8 inch sieve, and 95% or more of which passes through a No. 4 sieve. This composition also chemically interacts to provide a set composition, giving a relatively high early compressive strength.

One of the primary disadvantages of all the foregoing Havelin and Kahn patents is that the compositions covered do not develop any set when they have been compacted in place in cold weather, especially in sub-freezing temperatures. It is accordingly an object of this invention to provide a composition for building a load supporting base which can be constructed in cold weather, in sub-freezing weather. Another object is to provide such a composition which, even when built in warm weather has additional advantages over the aforementioned Havelin and Kahn compositions.

Another object of this invention is to provide a load bearing composition having a physical set with substantially no early compressive strength but having very high early bearing power.

Another object of this invention is to provide a load bearing composition which can be mixed under optimum conditions and shipped to the location at which it is to be fabricated into a load supporting material, and which has specifically controlled, high quality ingredients that provide an immediate load supporting surface which has the ultimate engineering qualities of Portland cement concrete.

Another object is to convert materials having low bearing strength into materials having high bearing strength.

Other objects and advantages of this invention will further become apparent hereinafter and in the drawing.

The drawing represents pavement strength curves wherein vertical pressure of failure is plotted against lateral pressure, for mixes in accordance with this invention and for mixes of the prior art as well.

In accordance with this invention, it has been discovered that the foregoing objects are attained by providing a composition of matter consisting essentially by weight of about 10–30% of pozzolan such as fly ash or natural pozzolan, and about 70–90% of a specifically controlled aggregate, bringing the balance to 100%, about 2–6% of lime based on the weight of pozzolan plus aggregate, and excess water in an amount of about 7–10% by weight, based upon the total weight of lime, fly ash and aggregate, the aggregate containing by weight from 30–70% of 3" to No. 4, 30–90% by weight from 4–60 mesh, and 0–20% through 200 mesh.

The aggregate is further preferably characterized by the fact that it has a California bearing ratio in the range of about 10 to about 100. However, this invention is particularly effective in conjunction with aggregates having California bearing ratios in the range from 30 to 100, which aggregates are normally considered to be unsuitable for the formation of load supporting bases.

The term "California bearing ratio" as referred to herein means an empirical procedure for compacting a specimen which is widely used throughout the country. Normally the specimen is compacted in a 6" diameter cylinder mold under 2000 pounds per sq. in. static pressure. After compaction a surcharge weight is placed on the specimen surface and the mold is submerged in water for four days. The swelling of the specimen is recorded. After completely soaking, the mold is placed in a testing machine and a plunger of 3 sq. in. area is forced one tenth of an inch into the specimen, and the resistance encountered at that penetration is recorded. The ratio of that resistance, to the resistance of crushed rock at the same penetration, represents the California bearing ratio.

As used throughout this specification and claims, the term "lime" indicates quicklime, hydrated lime and slaked lime. The term "hydrated lime" indicates a dry powder obtained by treating quicklime with water enough to satisfy its chemical affinity for water under the conditions of its hydration. It consists essentially of calcium hydrate or a mixture of calcium hydrate and/or magnesium oxide and/or magnesium hydroxide. In the above definition quicklime is used to indicate a calcined material the major portion of which is calcium oxide (or calcium oxide in natural association with a lesser amount of magnesium oxide) capable of slaking with water. The term "slaked lime" is used interchangeably with "hydrated lime." Both hydrated lime and slaked lime may be associated with excess water, resulting in a moist or slurried state or condition.

The term "fly ash" as used in the present specification is intended to indicate the finely divided ash residue produced by the combustion of pulverized coal, which ash is carried off with the gases exhausted from the furnace in which the coal is burned and which is collected from these gases usually by means of suitable precipitation apparatus such as electrical precipitators. The fly ash so obtained is in a finely divided state such that at least about 70% by weight passes through a 200 mesh sieve. The fly ash collected from the exhaust gases is hereinafter referred to as crude fly ash.

The terms "pozzolan" and "natural pozzolan" refer to materials which are ordinarily of volcanic origin and which when mixed with lime in the presence of moisture and compacted therewith, enter into a slow reaction causing the growth of strength bonds throughout the mass, and which ultimately set up to form a hard rock-like material.

The term "aggregate" in accordance with this invention refers to natural or artificial inorganic materials which are substantially chemically inert with respect to fly ash and lime, and substantially insoluble in water, such as limestone screenings, sand, blast furnace slag, gravel, or other equivalent materials having similar characteristics. In accordance with this invention a relatively coarse aggregate is included, as well as fine aggregate. An aggregate, within the meaning of the term as used in this specification, is a mixture of finely divided particles which may include limited amounts of relatively coarse particles, and may even include particles up to about 3 inches in size. Approximately the majority of the aggregate preferably consists of particles ranging in size from about No. 4 mesh to about 3 inches. Preferably, the sizing of the aggregate falls within the following range.

| Screen size: | Percent by weight passing |
|---|---|
| 2" | 100 |
| 1½" | 90–100 |
| 1" | 80–100 |
| ¾" | 70–90 |
| ⅜" | 50–90 |
| No. 4 | 30–80 |
| No. 10 | 20–50 |
| No. 40 | 10–30 |
| No. 60 | 5–20 |
| No. 200 | 0–20 |

The term "stress distribution gradient" is the angle through which the stress is distributed; it is equal to ½ the diameter of the circle through which the load is transferred to the adjacent layer divided by the thickness of the layer.

The relative proportions of the principal components of the compositions are important. When the proportions are maintained within a limited range, surprising durability improvement is obtained in the early stages of the setting period. The preferable proportions are as follows, percentages being by weight.

| Material: | Percent by weight (based on total of fly ash and aggregate) |
|---|---|
| Pozzolan | 10–30 |
| Aggregate | 70–90 |
| Lime | 2–6 |

As expressed above, the sum of the percentages of fly ash or natural pozzolan plus aggregate is substantially equal to 100 and the lime is additional. This is the basis used throughout the specification and claims in specifying proportions of the components of these compositions.

EXAMPLES OF AGGREGATES USED IN PLANT MIX POZZOLANIC COMPOSITIONS

| Percent passing | 1 | 2 | 3 | 4 | 5 | 6 | 7 | 8 | 9 |
|---|---|---|---|---|---|---|---|---|---|
| 3" | | 100 | | | | | | | |
| 1½" | | 95 | | 100 | | | 100 | | |
| 1" | | 85 | | 97 | | 100 | 85 | 100 | |
| ¾" | 100 | 70 | 100 | 93 | 100 | 97 | 71 | 90 | 100 |
| ⅜" | 89 | 56 | 95 | 74 | 64 | 89 | 58 | 74 | 99 |
| #4 | 58 | 43 | 72 | 58 | 41 | 75 | 43 | 55 | 76 |
| #10 | 42 | 36 | 50 | 50 | 25 | 72 | 26 | 37 | 48 |
| #10 | 37 | 12 | 30 | 22 | 14 | 26 | 16 | 10 | 16 |
| #60 | 26 | 6 | 20 | 12 | 12 | 7 | 5 | 6 | 10 |
| #200 | 13 | 0 | 15 | 2 | 9 | 1 | 2 | 1 | 6 |

The durability characteristics of these compositions are readily determined by testing samples thereof for underwater disintegration. One such method consists of forming a standard test block of the composition under investigation, allowing the block to set for a relatively short period, such as three days for example, under substantially dry conditions, and then submerging the block for several hours under still water. A sample having relatively poor durability tends to disintegrate, and a rough measure of its value is obtained by weighing the block after removing it from the water, to determine the loss of weight due to underwater disintegration.

The following examples are illustrative of the invention:

| Example No. | Percent by weight | | | |
|---|---|---|---|---|
| | Lime | Fly ash | Aggregate | Water |
| 1 | 3.0 | 10 | 90 (2A Modified Stone) | 6 |
| 2 | 4.4 | 9 | 36.0 Sand / 25.3 2B Stone / 25.3 3A Stone | 5.5 |
| 3 | 5.0 / 3.5 / 5.0 | 10 / 15 / 10 | 90 (Screenings) / 85 (Screenings) / 90 (Pa. Sub-base ¾" Top) | 7 / 7 / 5.5 |
| 4 | 3.5 | 10 | 90 (Gravel) | 8 |
| 5 | 5.0 | 10 | 90 (Gravel) | 7.5 |
| 6 | 3.0 | 12.5 | 87.5 (Gravel) | |
| 7 | 5.0 | 12.0 | 88 | |
| 8 | 3.0 | 11.0 | 89 | |
| 9 | | 10.0 | 90 | |
| 10 | 3.5 | 13.0 | 87 (Slag) | |

The drawing shows graphically the results of Examples 1 and 2 above, compared to conventional compositions using crushed slag, crushed limestone, gravel, sand, clay gravel and asphaltic concrete cores.

Example 11

In January, in the area of Philadelphia, Pennsylvania, a road was constructed from a plant mix composition which had the following formula:

| | Percent by weight |
|---|---|
| Lime | 4.77 |
| Fly ash | 9.53 |
| Pa. special subbase, ¾" size | 85.7 |

This composition was placed and compacted during the middle of January, at an ambient temperature of about 40° F. About two days later the ambient temperature dropped to 10° F., thereby subjecting the newly placed composition to destructive forces of freezing. Notwithstanding such conditions, the composition exhibited excellent load bearing characteristics and had sufficient stability immediately to resist the action of heavy truck traffic. Although substantially no chemical setting took place, the physical setting of the mix provided excellent load bearing characteristics throughout the winter and after eight months the composition achieved a strong permanent physical and chemical set.

The California bearing ratio test on this material after four days gave a value of 92.

This same road when subjected to ambient conditions for about 12 months developed a secondary chemical set, producing a compressive strength of about 2000 pounds per square inch, and since that time the road has continued to increase in strength.

It is to be emphasized that the composition in accordance with this invention provides a first class road base as distinguished from supporting structures for shoulders and the like which are second class load supporting bases. It has been found that this composition tolerates more of the deleterious materials such as silts, clays and other plastic soils, for example.

It is important that in the final mixture in accordance with this invention, the liquid limit shall not exceed about 25 and the plasticity index shall not exceed about 6.

The product in accordance with this invention may be used immediately even in the late fall and under winter conditions. It has excellent stability immediately, even under frost conditions. Its frost susceptibility is low and it has excellent durability, permitting it to sustain the action of modern traffic, both as to loading and frequency of loading.

In addition to these highly unexpected characteristics, this composition has advantages in warm weather over the prior Havelin and Kahn compositions. It gives an improved stress distribution gradient and will tolerate a reduction in thickness for equal loads.

Layered paving has been found to fail in one or more of three ways: vertical shear, horizontal shear at the interface between layers, and deflection. Deflection is a tendency to bow downwardly followed by a rebound as a load passes over a given point. With respect to all three of these types of failure, the material in accordance with this invention radically improves the resistance of the pavement, as distinguished from load supporting surfaces of other types that are currently available.

It is of particular advantage that the load supporting base in accordance with this invention has a substantial stiffness. Its internal stiffness or integrity spreads out through a relatively wide angle, thereby providing a diffused stress distribution with the result that the material is better able to withstand the heavy loads to which it is subjected. One way of measuring this quantitatively is by means of the stress distribution gradient, as referred to heretofore.

Notwithstanding its stiffness, the material in accordance with this invention has surprisingly good extensibility. It is not brittle and will not crack unless subjected to conditions far beyond those normally encountered.

One of the primary advantages, according to this invention, is the fact that the composition immediately undergoes a physical set as soon as it is compacted in place. The physical set provides excellent and immediate load bearing qualities enabling the operators to subject the load supporting surface to heavy loads such as by driving trucks over the surface, for example. The physical set that is achieved is to be distinguished sharply from an early pozzolanic reaction resulting from the chemical set and which involves chemical reactions of the lime with pozzolan. It is believed that the physical set involves a bridging of the aggregate particles in the mix together with a reorientation of the crystals of the hydrated lime in the lime-fly ash matrix.

Good mechanically graded aggregate, which is conventionally used in many states, is often found to do an excellent job under dry weather conditions but a poor job under wet weather conditions. The composition in accordance with this invention has tremendous bearing power under water saturated conditions. In fact, water even improves its stability or bearing strength under many conditions.

An important advantage of this composition is that plastic soils may be added in limited quantities to it, without interfering with its effectiveness. Any plastic soil that is added should not be considered as a part of the screen analysis of the aggregate.

The compositions in accordance with this invention may be prepared in a variety of ways, but it is of particular advantage in accordance with this invention that the ingredients are mixed in a mixing plant as distinguished from the mix-in-place method. The fly ash or natural pozzolan is mixed mechanically with the lime and the aggregate is mixed intimately and uniformly with both the lime and the fly ash. The composition thus mixed in a plant or the like may be put up in bags or other containers or may be deposited in trucks or other vehicles for transporting the plant mix to the situs of the road building or other operation.

The plant mix also preferably contains about 7–10% by weight of water, based upon the total weight of lime, fly ash and aggregate.

The product may be formed into the desired shape at the situs of the road building operation in a wide variety of ways. Preferably, the road course is cleared and dug to the desired depth, whereupon ordinary road building equipment distributes and compacts the plant mix. This procedure greatly simplifies the operation as distinguished from the mix-in-place method and results in the use of far fewer man hours of labor for producing a load supporting course of the same size.

It will be appreciated that, although this invention has been described with specific reference to several examples thereof, many other modifications may be made without departing from the spirit or scope of the invention. In the claims, the expression "consisting essentially of" does not imply that the compositions must be free of other additives; it is intended as a definition of those components which must be present in order to obtain the benefits of the invention, and these benefits are obtained whether the specified components are present alone or mixed with one or more compatible additives. Further, equivalent elements may be substituted for those specifically disclosed herein, and certain features of the invention may be used independently of other features without departing from the spirit or scope of the invention as defined in the appended claims.

Having thus described my invention, I claim:

1. A load supporting surface material consisting essentially by weight of about 10–30% pozzolan, about 70–90% of an aggregate of substantially chemically inert inorganic material, both the foregoing percentages being based upon the sum of pozzolan plus aggregate, and about 2–6% by weight of lime based upon the total weight of pozzolan plus aggregate, said aggregate being substantially unreactive with lime and fly ash and consisting essentially of particulate material having by weight about 30–70% of particles ranging in size from 3 inch to No. 4, about 30–90% from 4 to 60 mesh, and about 0–20% through 200 mesh, said aggregate having a california bearing ratio of about 10–100.

2. A load supporting surface material consisting essentially by weight of about 10–30% fly ash, about 70–90% of an aggregate of substantially chemically inert inorganic material, both the foregoing percentages being based upon the sum of fly ash plus aggregate, and about 2–6% by weight of lime based upon the total weight of fly ash plug aggregate, said aggregate being substantially unreactive with lime and fly ash and consisting essentially of particulate material having by weight about 30–70% of particles ranging in size from 3 inch to No. 4, about 30–90% from 4 to 60 mesh, and about 0–20% through 200 mesh, said aggregate havinng a California bearing ratio of about 30–100, and about 7–10% by weight of water based upon the weight of lime, fly ash and aggregate.

3. A load supporting surface material consisting essentially by weight of about 10–30% pozzolan, about 70–90% of an aggregate of substantially chemically inert inorganic material, both the foregoing percentages being based upon the sum of pozzolan plus aggregate, and about 2–6% by weight of lime based upon the total weight of pozzolan plus aggregate, said aggregate being substantially unreactive with lime and fly ash and consisting essentially of particulate material having by weight about 30–70% of particles ranging in size from 3 inch to No. 4, about 30–90% from 4 to 60 mesh, and about 0–20% through 200 mesh, said aggregate having a California bearing ratio of about 30–100, and the final mixture having a maximum liquid limit of about 25 and a maximum plasticity index of about 6.

4. A load supporting surface material consisting essentially by weight of about 10–30% pozzolan, about 64–88% of an aggregate of substantially chemically inert inorganic material, both the foregoing percentages being based upon the sum of pozzolan plus aggregate, and about 2–6% by weight of lime based upon the total weight of pozzolan plus aggregate, said aggregate being substantially unreactive with lime and fly ash and consisting essentially of particulate material having about the following mechanical analysis.

| Screen size: | Approximate percent by weight passing |
|---|---|
| 1½″ | 100 |
| 1″ | 85–100 |
| ¾″ | 70–100 |
| ⅜″ | 50–100 |
| No. 4 | 35–75 |
| No. 10 | 20–50 |
| No. 40 | 10–30 |
| No. 60 | 5–20 |
| No. 200 | 0–15 |

5. A load supporting surface material consisting essentially by weight of about 9–15% fly ash, about 85–91% of an aggregate of substantially chemically inert inorganic material, both the foregoing percentages being based upon the sum of fly ash plus aggregate, and about 3–6% by weight of lime based upon the total weight of fly ash plus aggregate, said aggregate being substantially unreactive with lime and fly ash and consisting essentially of particulate material having the following mechanical analysis.

| Screen size: | Percent by weight passing |
|---|---|
| 1½″ | 100 |
| 1″ | 85–100 |
| ¾″ | 70–100 |
| ⅜″ | 50–100 |
| No. 4 | 35–75 |
| No. 10 | 20–50 |
| No. 40 | 10–30 |
| No. 60 | 5–20 |
| No. 200 | 0–15 |

6. A load supporting surface material consisting essentially by weight of about 9–15% natural pozzolan, about 85–91% of an aggregate of substantially chemically inert inorganic material, both the foregoing percentages being based upon the sum of natural pozzolan plus aggregate, and about 3–6% by weight of lime based upon the total weight of natural pozzolan plus aggregate, said aggregate being substantially unreactive with lime and fly ash and consisting essentially of particulate material having the following mechanical analysis.

| Screen size: | Percent by weight passing |
|---|---|
| 1½″ | 100 |
| 1″ | 85–100 |
| ¾″ | 70–100 |
| ⅜″ | 50–100 |
| No. 4 | 35–75 |
| No. 10 | 20–50 |
| No. 40 | 10–30 |
| No. 60 | 5–20 |
| No. 200 | 0–15 |

References Cited in the file of this patent

UNITED STATES PATENTS

| | | |
|---|---|---|
| 2,564,690 | Havelin | Aug. 21, 1951 |
| 2,698,252 | Havelin | Dec. 28, 1954 |
| 2,815,294 | Havelin | Dec. 3, 1957 |
| 2,942,993 | Handy et al. | June 28, 1960 |